(12) United States Patent
Miura et al.

(10) Patent No.: US 6,341,896 B1
(45) Date of Patent: Jan. 29, 2002

(54) HYDRODYNAMIC BEARING AND METHOD OF MANUFACTURING THE SAME

(75) Inventors: Kazushi Miura; Masato Gomyo; Takayuki Narita; Tokio Tago; Takehiko Yazawa, all of Nagano (JP)

(73) Assignee: Kabushiki Kaisha Sankyo Seiki Seisakusho, Nagano (JP)

( * ) Notice: Subject to any disclaimer, the term of this patent is extended or adjusted under 35 U.S.C. 154(b) by 0 days.

(21) Appl. No.: 09/549,593

(22) Filed: Apr. 14, 2000

(30) Foreign Application Priority Data

Apr. 15, 1999 (JP) .......................... 11-107723

(51) Int. Cl.[7] .............................. F16C 17/02
(52) U.S. Cl. .................. 384/115; 384/114; 384/625
(58) Field of Search ................. 384/115, 114, 384/625, 107, 121

(56) References Cited

U.S. PATENT DOCUMENTS 6,271,612 B1 * 8/2001 Tanaka et al.
2001/0022869 * 9/2001 Tanaka et al.

FOREIGN PATENT DOCUMENTS

JP 10-89345 4/1998 ........... F16C/17/02

* cited by examiner

*Primary Examiner*—Lenard A. Footland
(74) *Attorney, Agent, or Firm*—Sughrue Mion, PLLC

(57) ABSTRACT

A shaft member 21 the flexible, austenitic stainless steel is cold worked, and in the cold working process, a cold working ratio is increased, whereby a surface of the shaft member 21 is hardened. Therefore, there is no need for a nitriding treatment for the surface hardening. The corrosion proof performance of the passive coating possessed by the stainless steel is kept as intact.

4 Claims, 3 Drawing Sheets

HYDRODYNAMIC BEARING AND METHOD OF MANUFACTURING THE SAME

BACKGROUND OF THE INVENTION

The present invention relates to a hydrodynamic bearing in which a dynamic pressure is generated in a lubricating fluid located between a dynamic pressure surface of a shaft member and a dynamic pressure surface of a bearing member, whereby both members are supported so as to be relatively rotatable, and a method of manufacturing the same.

Recently, there are many proposals on a hydrodynamic bearing for rotatably supporting various types of a rotary body rotating at high speed, such as a polygon mirror, a magnetic disc, an optical disc, or the like. In the hydrodynamic bearing, a dynamic pressure surface of a shaft member is disposed facing a dynamic pressure surface of a bearing member (bearing sleeve) when viewed in the radial direction in a state that a predetermined gap is present therebetween. A hydrodynamic bearing portion is formed in the gap. A dynamic pressure generating groove is formed in at least one of those dynamic pressure surfaces. A lubricating fluid that is injected into the hydrodynamic bearing portion, such as air or oil, is pressurized through a pumping action by the dynamic pressure generating groove when it rotates. The shaft member and the bearing member, while being in a floating state, are supported by a dynamic pressure of the lubricating fluid in a state that those are relatively rotatable.

Recently, in various types of the rotary-body drive device employing such a hydrodynamic bearing, the size and thickness reduction thereof rapidly progresses. With this trend, attempt has been made of making the bearing member (bearing sleeve), which supports shaft member, of a copper group metal. The reason for this is that even when the hydrodynamic bearing is reduced in diameter for the purpose of size reduction, easy working of the bearing member, in particular the inner side thereof, is secured by using phosphor bronze or the like, which is good in workability, for the bearing member. Where the bearing member of the copper group metal is used, austenitic stainless steel, such as SUS303 (indication based on JIS), in place of the usually used, austenitic stainless steel, such as SUS420J2 or SUS440C (indication based on JIS), is sometimes used for the shaft member with such an intention that the shaft member has a thermal expansion coefficient comparable with that of the bearing member.

As described above, if the shaft member is made of the austenitic stainless steel, its surface hardness is reduced, because of its properties, when comparing with that of the shaft member made of the martensitic stainless steel, usually used. Accordingly, its hardness cannot be increased even if it is subjected to sintering process. Therefore, in working process of the shaft member, the surface of it is easy to be flawed, and parts protruded around the flaws come in contact with a dynamic pressure surface of the bearing member as a counterpart member. Sometimes, this leads to reduction of device lifetime.

To solve the problem, in the device disclosed in Japanese Patent Publication No. 10-89345A, the shaft member made of the austenitic stainless steel is subjected to a nitriding treatment, whereby a nitrided layer is formed on the surface of the shaft member, and its surface hardness is increased. In the nitriding treatment, the passive coating inherently possessed by the stainless steel is substituted by a nitrided iron. As a result, its corrosion proof is remarkably deteriorated, so that it is easy to be rusted. The nitrided layer formed by the nitriding process is put on a surface layer of a flexible base. Therefore, it is difficult to prevent indentations that will be formed in the shaft member by hitting.

SUMMARY OF THE INVENTION

Accordingly, an object of the present invention is to provide a hydrodynamic bearing which improves the surface hardness of the shaft member without deteriorating its corrosion proof, and well prevents the protrusion formation in its surface, and a method of manufacturing the same.

To achieve the above object, there is a hydrodynamic bearing comprising:

a shaft member having a first dynamic pressure surface;

a bearing member having a second dynamic surface facing the first dynamic pressure surface while having a gap therebetween, which is held rotatably relative to the shaft member and made of a copper group metal containing a copper component;

lubricating fluid being interposing between the gap between the first and second dynamic pressure surfaces; and a plurality of dynamic pressure generating grooves formed in at least one of the first and second dynamic pressure surfaces;

wherein the bearing member consists of a product formed by cold working austenitic stainless steel blank, and having a surface hardness of 300 Hv or harder obtained under a condition that the austenitic stainless steel blank is cold worked at a cold working ratio of 20% or higher.

In the present invention, the shaft member made of the flexible, austenitic stainless steel is cold worked, and in the cold working process, a cold working ratio is increased to a predetermined value or higher, whereby a surface of the shaft member is hardened. Therefore, there is no need for a nitriding treatment for the surface hardening. Corrosion proof degradation of the shaft member is prevented while leaving a passive coating inherently possessed by the stainless steel as intact. The hardening action based on the increase of the cold working ratio reaches to a depth of the shaft member deeper than by the conventional nitriding treatment. Therefore, formation of indentations in the shaft member surface when hit by something are also prevented more satisfactorily.

In this case, if nitrogen in the amount of 0.1 wet % or higher is added to the austenitic stainless steel blank, the surface hardness of the shaft member is further increased. The hardening process on the basis of the increased cold working ratio, which is applied to the shaft member is carried out so that the shaft member is hardened over a range of from the surface of the shaft member to a depth of 2 mm or deeper, the flaw formation is more reliably prevented.

DETAILED DESCRIPTION OF THE PREFERRED EMBODIMENTS

Before proceeding with description of the preferred embodiment of the present invention, a structure of a hard disc device (HDD) to which the invention is applied will first be described with reference to the accompanying drawings.

Figure 1:
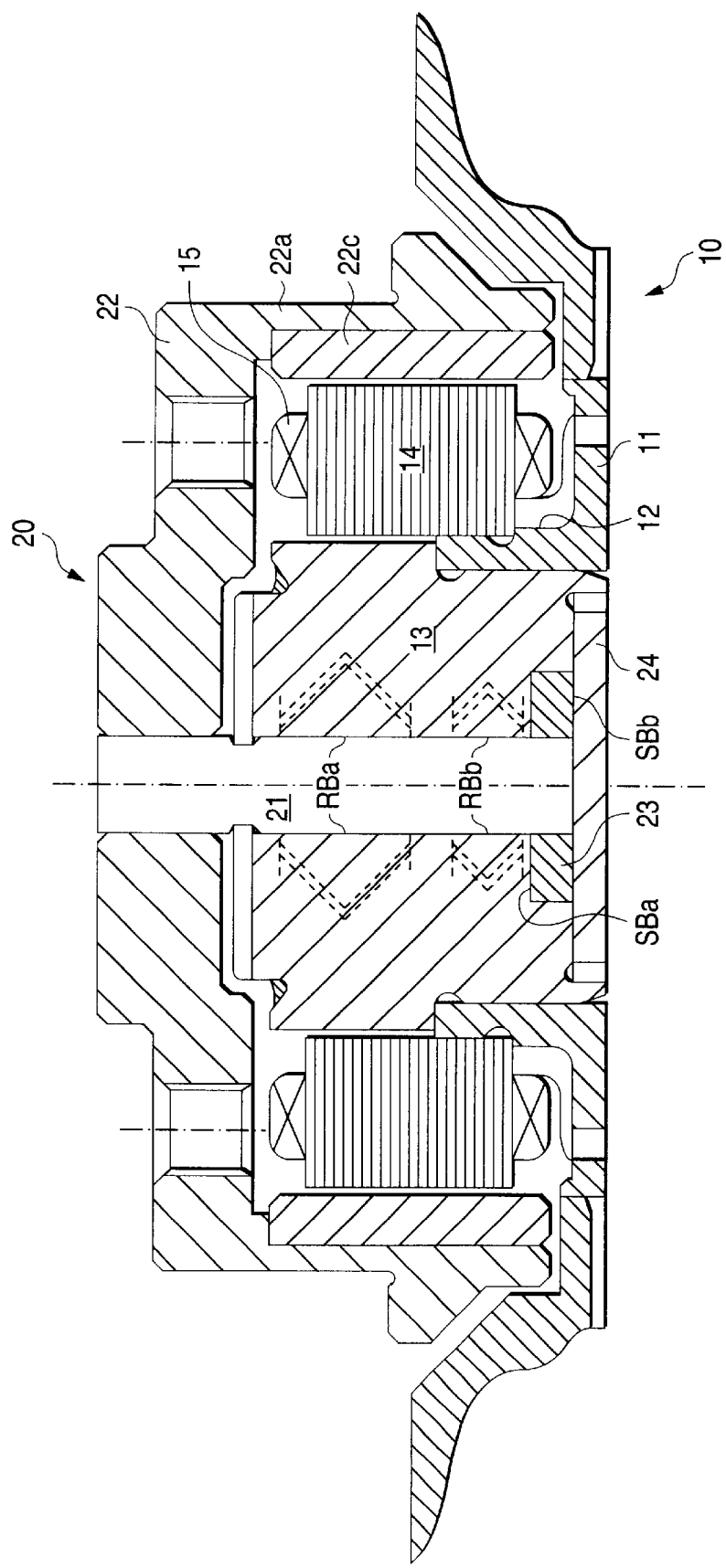
FIG. 1 is a transverse cross sectional view showing a hard disc drive (HDD) motor of the shaft rotation type into which the present invention is incorporated.

An HDD spindle motor which is of the shaft rotation type shown in FIG. 1 is generally made up of a stator assembly 10 as a fixed member, and a rotor assembly 20 as a rotational member, which is assembled to the stator assembly 10 from its above in the figure. The stator assembly 10 includes a fixing frame 11 fastened to the fixing base (not shown) by means of screws. The fixing frame 11 is made of aluminum group metals for the weight-reduction purpose. An annular mounting portion 12 stands erect at the central portion of the fixing frame 11. A bearing sleeve 13 as a fixed bearing member shaped like a hollowed cylinder is press fit or shrinkage fit into the inner part of the annular mounting portion 12, thereby forming a unitary body.

The bearing sleeve 13 is made of a copper group material, such as a phosphor bronze, in order to make it easy to form a small-diameter hole. The radial dimension of the outer surface of the bearing sleeve 13 is substantially equal to that of the outer surface of the annular mounting portion 12. A stator core 14 is fit into a mounting surface consisting of the outer surfaces of the bearing sleeve 13 and the annular mounting portion 12. Drive coils 15 are wound around protruding poles provided on the stator core 14.

A rotary shaft 21 forming the rotor assembly 20 is rotatably inserted into the center hole of the bearing sleeve 13. That is, a dynamic pressure surface formed on the inner wall of the bearing sleeve 13 is disposed in immediate proximity to and facing a dynamic pressure surface formed on the outer surface of the rotary shaft 21, whereby a set of radial hydrodynamic bearings Rba and RBb are formed while being disposed adjacent to each other in the axial direction. Here, the dynamic pressure surface on the rotary shaft 21 constitute first dynamic pressure surface of the present invention and the dynamic pressure surface on the bearing sleeve 13 constitutes a second dynamic pressure surface of the present invention. To be more specific, in the radial hydrodynamic bearings Rba and RBb, a dynamic pressure surface of the bearing sleeve 13 is circumferentially opposed to a dynamic pressure surface of the rotary shaft 21 while being spaced from each other by a minute gap of several $\mu$m. A lubricating fluid, such as oil, magnetic fluid or air, is injected into the bearing space of the minute width, while being continuous in the axial direction.

Dynamic pressure generating grooves shaped like herringbone (not shown) are annularly formed in one of the dynamic pressure surfaces of the bearing sleeve 13 and the rotary shaft 21 in two blocks being axially arrayed. When the rotary shaft rotates, the lubricating fluid is pressurized through pumping action of the dynamic pressure generating grooves to generate a dynamic pressure. By the dynamic pressure of the lubricating fluid, a rotary hub 22 to be described later, together with the rotary shaft 21, is supported in the radial direction.

Capillary sealing portions are located at both ends (as viewed in the axial direction) of the bearing space which forms the radial hydrodynamic bearings Rba and RBb in a state that those sealing portions sandwich those radial hydrodynamic bearings Rba and RBb as viewed in the axial direction. Each of the capillary sealing portions is formed such that the gap between the bearing sleeve 13 and the rotary shaft 21 is gradually expanded outwardly by the utilization of a slanted surface formed on the bearing sleeve 13. In the embodiment, the gap of each capillary sealing portion, which is disposed within the bearing, ranges from 20 $\mu$m to 300 $\mu$m. The capillary sealing portions are arranged such that a fluid level of the lubricating fluid is positioned when the motor rotates and stops.

The rotary hub 22, together with the rotary shaft 21, which forms the rotor assembly 20, is shaped like a cup made of an aluminum group metal so that it supports a recording medium, e.g., a magnetic disc (not shown) thereon. A joining hole formed in the central portion of the rotary hub 22 is press fit or shrinkage fit to the upper part of the rotary shaft 21, thereby forming a unitary body.

The rotary hub 22 includes a cylindrical portion 22a the outer surface of which receives a recording disc applied thereto. An annular drive magnet 22c is mounted on the inner circumferential surface of the cylindrical portion 22a. The annular drive magnet 22c is disposed in close proximity to and facing the outer circumferential surface of the stator core 14.

A disc-like thrust ring 23 is secured to the lower end portion of the rotary shaft 21. Specifically, the thrust ring 23 is put in a cylindrical hollow formed in the central portion of the lower end portion of the bearing sleeve 13 in the drawing. Dynamic pressure surfaces of the thrust ring 23 and the bearing sleeve 13 are confronted with reach other within the hollow, while being disposed in close proximity to each other. Those dynamic pressure surfaces form an upper thrust hydrodynamic bearing Sba.

A counter plate 24 of a large disc-like member is secured to a sunken portion formed in the bottom of the bearing sleeve 13, while closing to the dynamic pressure surface of the thrust ring 23 located above as viewed in the drawing. A dynamic pressure surface provided on the upper surface of the counter plate 24 cooperates with the dynamic pressure surface of the thrust ring 23, to thereby form a lower thrust hydrodynamic bearing SBb.

To be more specific, in a couple of first and second upper thrust hydrodynamic bearings SBa and SBb which are axially juxtaposed, both the dynamic pressure surfaces of the thrust ring 23 and the counter dynamic pressure surfaces of the bearing sleeve 13 and the counter plate 24 are axially spaced from each other by a gap of several $\mu$m. A lubricating fluid, such as oil, magnetic fluid or air, while being continuous in the axial direction, is injected into the bearing space of the minute width through a passage of the outer surface of the thrust ring 23.

Dynamic pressure generating grooves shaped like herringbone (not shown) are annularly formed in one of the dynamic pressure surfaces of the thrust ring 23, and the bearing sleeve 13 and the counter plate 24 in two blocks being axially arrayed. When the rotary shaft rotates, the lubricating fluid is pressurized through pumping action of the thrust dynamic pressure generating grooves to generate a dynamic pressure. By the dynamic pressure of the lubricating fluid, the above-mentioned rotary hub 22 is supported in the thrust direction.

Here, the rotary shaft 21 is made of an austenitic stainless steel such as SUS301, 303, 304, etc. (indication based on JIS). The reason why the austenitic stainless steel is used for a material of the rotary shaft 21 is that its thermal expansion coefficient is selected to be substantially equal to that of copper group metal making the bearing sleeve 13 as a fixed bearing member, whereby the gap in the hydrodynamic bearing is kept as constant as possible.

The rotary shaft 21 of the austenitic stainless steel is manufactured by a cold working process, in addition to a usual hot working process. In the cold working process, a cold working ratio, viz., a ratio of a cross sectional area of a product after cold worked to the cross sectional area of the original product, is set at 20% or higher. By so selecting, the cold worked shaft has a surface hardness of 300 Hv (Vickers hardness) or higher. Specifically, a steel ingot as a blank of the rotary shaft 21 is subjected to of the processes of steel ingot rolling, slab rolling, and large steel bar rolling, and a hot rolling (bar steel rolling) process and then a cold working process. In the cold working process, the outer diameter of the semi-product are gradually reduced through a cold rolling process and a cold drawing process. The higher a cold working rate (area reduction ratio), viz., a degree of the size reduction, is, the higher a hardness of the surface region of the semi-product will be.

A steel bar made of austenitic stainless steel of 10 mm in diameter, for example, is prepared. The steel bar is manufactured by a hot working process, and its surface hardness is 180 Hv or lower. To work the steel bar into a shaft of 8 mm in diameter, it is generally reduced in diameter by peeling process. A surface hardness of the thus formed shaft is equal to that of the steel bar, i.e., 180 Hv or lower. In this connection, in the present invention, a die having an inlet of 10 mm and an outlet of 8 mm is used. A steel bar of 10 mm in diameter is forcibly put into the die through the inlet, and is pulled out of the die through the outlet, whereby a steel bar of 8 mm in diameter is produced. This working process is called a cold working process. A cross sectional area of the bar of 10 mm in diameter is 25 π, and that of the shaft after cold worked is 16 π. In this case, a cold work ratio (area reduction ratio) is 36%, accordingly. As already described, in the present invention, a cold working rate of the rotary shaft as the shaft member is selected to be 20% or less, so that 200 Hv or higher is secured for the surface hardness.

Figure 2:
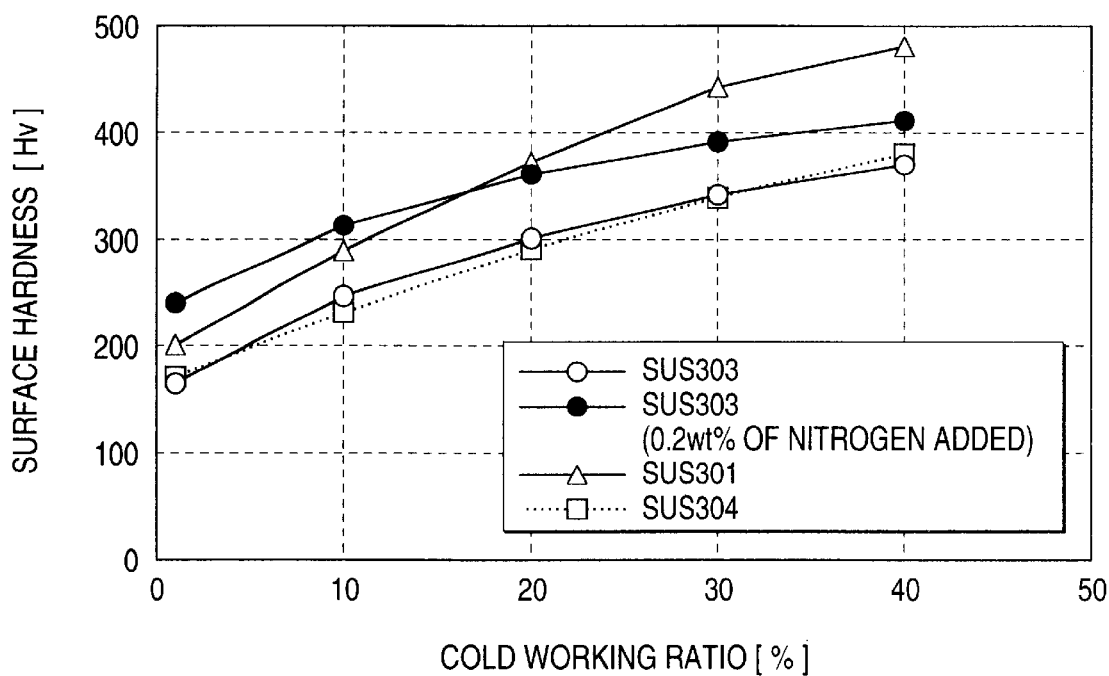
FIG. 2 is a graphical representation of a relationship between a surface hardness and a cold working ratio on an austenitic stainless steel.

FIG. 2 graphically shows a relationship between a surface hardness (ordinate:Hv) and a cold working ratio (abscissa:%) on an austenitic stainless steel making the rotary shaft 21. As seen from the graph, the surface hardness increases with increase of the cold working rate for all the austenitic stainless steel blanks, more precisely blanks of SUS301, SUS302, SUS303 and SUS304 to which 02. Wet. % of nitrogen is added (dispersed).

Figure 3:
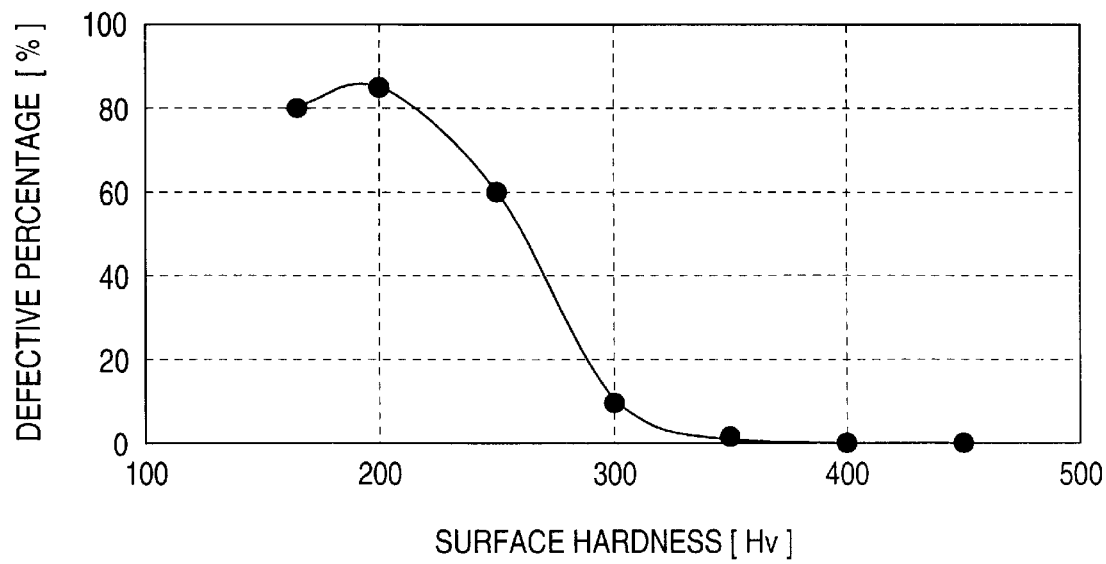
FIG. 3 is a graphical representation of a relationship between a defective percentage of the products in the manufacturing process and a surface hardness of the product.

Already stated in the background art description, when a flexible, austenitic stainless steel is used for the rotary shaft 21, its surface is easy to be flawed. As a result, a defective percentage of the products is high. The defective percentage may be reduced by increasing a hardness of the surface region of it, however. FIG. 3 is a graphical representation of a relationship between a defective (flaw creation) percentage of the products (ordinate:%) during a washing process and a surface hardness (abscissa:Hv) of it. The graph shows that a defective percentage abruptly increases when a surface hardness of the rotary shaft 21 is 300 Hv or lower. From this, it is seen that the surface hardness must be 300 Hv or higher in order to produce the flawless rotary shafts 21. To this end, the cold working ratio must be 20% or higher fort he austenitic stainless steel, as seen from FIG. 2.

In the present invention, the shaft member made of the flexible, austenitic stainless steel is cold worked, and in the cold working process, a cold working ratio is increased to 20% or higher, whereby a surface of the shaft member is hardened as desired. As a result, there is no need for a conventional nitriding treatment for the surface hardening. Corrosion proof degradation of the shaft member is prevented while leaving a passive coating possessed by the stainless steel as intact. Accordingly, the rotary shaft 21 is well prevented from being rusted.

Figure 4:
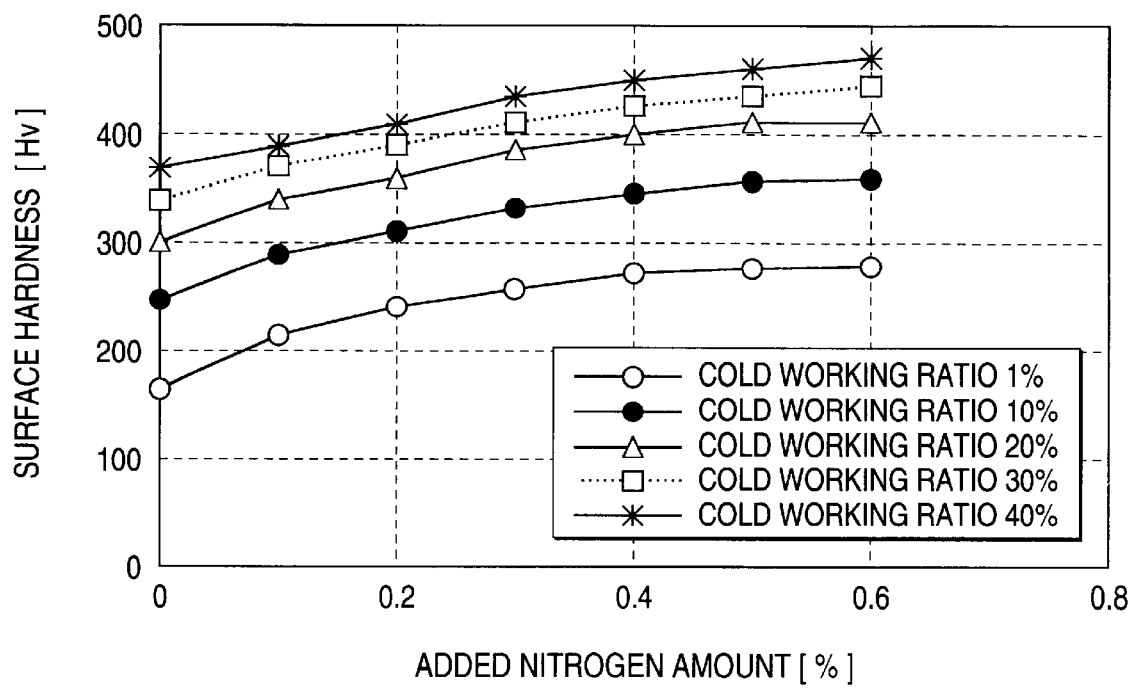
FIG. 4 is a graphical representation of a variation of a surface hardness of the shaft member with respect to an amount of nitrogen added to the shaft member.

Further, 0.1 wet % or higher of nitrogen is added to the austenitic stainless steel blank of the rotary shaft 21. That is, a surface hardness of the rotary shaft 21 is further increased as shown in FIG. 4 by dispersing or adding a nitrogen component into or to the flexible, austenitic stainless steel. FIG. 4 is a graphical representation of a variation of a surface hardness of the rotary shaft 21 (ordinate:Hv) with respect to an amount of nitrogen added to the austenitic stainless steel (abscissa:wet. %). In the graph, parameters are the cold working ratios. The graph teaches that the surface hardness increases with increase of the amount of the added nitrogen while independently of the value of the cold working ratio. It is essential that the nitrogen is contained in amount of 0.1 wet % or higher.

Figure 5:
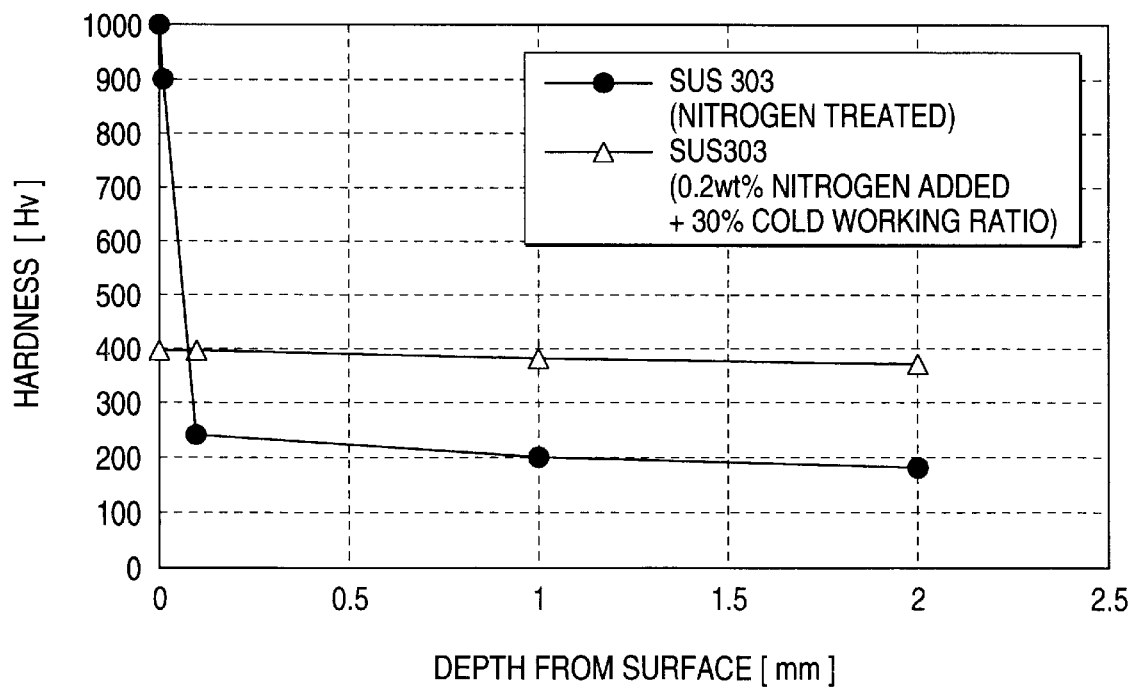
FIG. 5 is a graphical representation of a variation of a hardness with respect to a depth measured from the surface of the shaft member.

A hardening action by the increase of the cold working ratio and/or the adding of the nitrogen reaches to a depth of the shaft member deeper than by the conventional nitriding treatment. Therefore, the indentation formed in the shaft by hitting may be well prevented. FIG. 5 is a graph comparatively showing hardness (ordinate:Hv) vs. depth (abscissa:mm) relationships. The depth is measured from the surface of the rotary shaft 21. Those relationships were measured on a rotary shaft formed by the nitriding treatment and a rotary shaft formed under conditions that the cold working ratio is increased and nitrogen is added. As seen from the graph, in the case of the rotary shaft by the nitriding treatment, only a shallow surface region of the shaft is hardened. In the case of the product of the invention, it is uniformly hardened over a range of from the product surface to a depth of 2 mm or deeper. Thus, where the product is uniformly hardened over a range of from the product surface to a depth of 2 mm or deeper, flaw formation is more reliably prevented.

While a specific embodiment has been described in detail, it is understood that the invention is not limited to such an embodiment but may variously be modified, altered and changed within the true spirits of the invention.

In the embodiment described above, the invention is applied to the hydrodynamic bearing of the shaft rotation type. It is evident that the invention may be applied to the hydrodynamic bearing of the shaft fixing type.

It is also evident that the present invention may be applied to a hydrodynamic bearing used for any other device than the motor mentioned above, for example, a polygon mirror drive motor or a CD-ROM drive motor.

What is claimed is:

1. A hydrodynamic bearing comprising:
   a shaft member having a first dynamic pressure surface;
   a bearing member having a second dynamic surface facing the first dynamic pressure surface while having a gap therebetween, which is held rotatably relative to the shaft member made of a copper group metal containing a copper component;
   lubricating fluid being interposing between the gap between the first and second dynamic pressure surfaces; and
   a plurality of dynamic pressure generating grooves formed in at least one of the first and second dynamic pressure surfaces;

wherein the shaft member consists of a product formed by cold working austenitic stainless steel blank, and having a surface hardness of 300 Hv or harder obtained under a condition that the austenitic stainless steel blank is cold worked at a cold working ratio of 20% or higher.

2. The hydrodynamic bearing as set forth in claim 1, wherein 0.1 wet % or higher of nitrogen is added to the austenitic stainless steel blank of the shaft member.

3. The hydrodynamic bearing as set forth in claim 1, wherein the shaft member has the surface hardness of 300 Hv or higher over a range of from the surface of the shaft member to a depth of 2 mm or deeper.

4. The hydrodynamic bearing as set forth in claim 1, wherein shaft member is formed without a nitriding treatment.

\* \* \* \* \*